(No Model.) 2 Sheets—Sheet 1.

S. P. GRAHAM.
LAWN MOWER.

No. 525,388. Patented Sept. 4, 1894.

Witnesses

Inventor
Simon P. Graham
By Thos. S. Sprague & Son Atty's (No Model.) 2 Sheets—Sheet 2.

S. P. GRAHAM.
LAWN MOWER.

No. 525,388. Patented Sept. 4, 1894.

Witnesses
A. L. Hobby
C. F. Barthel

Inventor
Simon P. Graham
By Mr. T. Sprague & Son
Attys.

UNITED STATES PATENT OFFICE.

SIMON PETER GRAHAM, OF DETROIT, MICHIGAN, ASSIGNOR TO HERBERT C. WALKER AND JOHN G. PATTERSON, OF SAME PLACE.

LAWN-MOWER.

SPECIFICATION forming part of Letters Patent No. 525,388, dated September 4, 1894.

Application filed January 29, 1894. Serial No. 498,411. (No model.)

*To all whom it may concern:*

Be it known that I, SIMON PETER GRAHAM, a citizen of the United States, residing at Detroit, in the county of Wayne and State of Michigan, have invented certain new and useful Improvements in Lawn-Mowers, of which the following is a specification, reference being had therein to the accompanying drawings.

The invention consists in the peculiar construction of the frame, the supporting wheels, and the cutter actuating devices, whereby the machine may be provided with a central drive gear, and yet cut clear across.

The invention further consists in the peculiar construction, arrangement and combination of the various parts, all as more fully hereinafter described.

Figure 1:
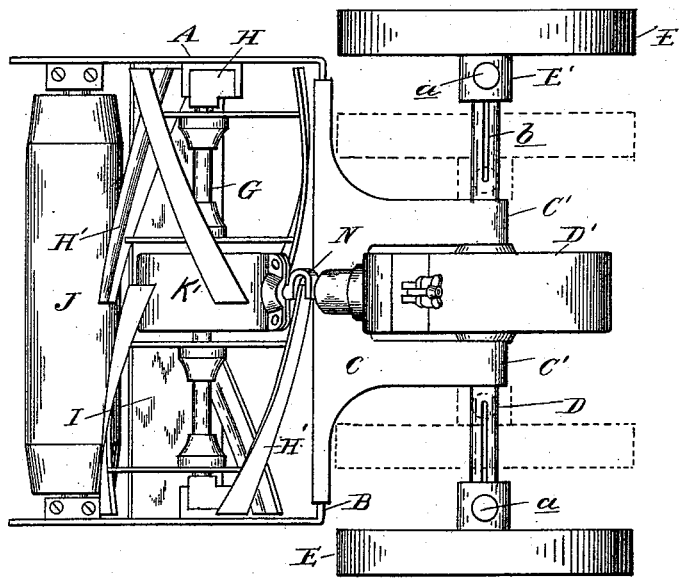
Figure 2:
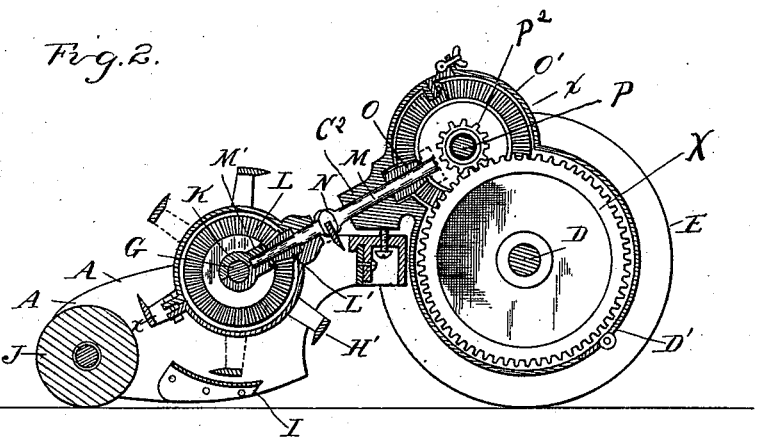
Figure 3:
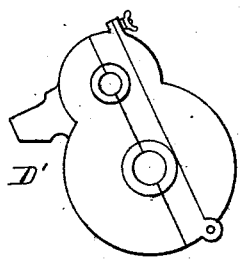
Figure 6:
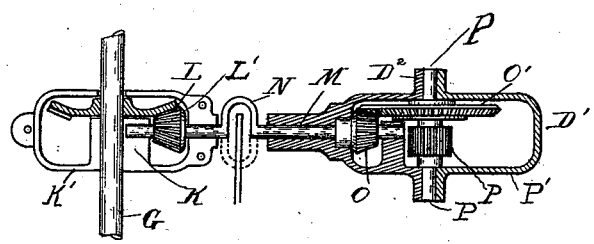
Figure 5:
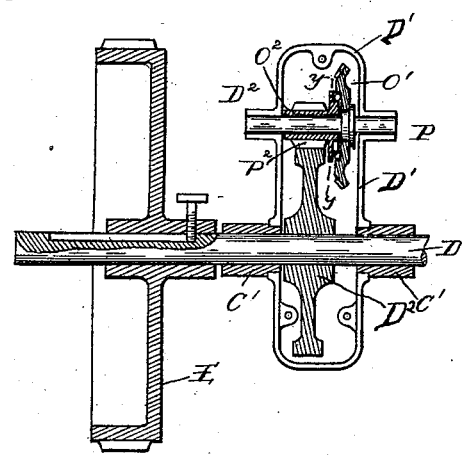
Figure 8:
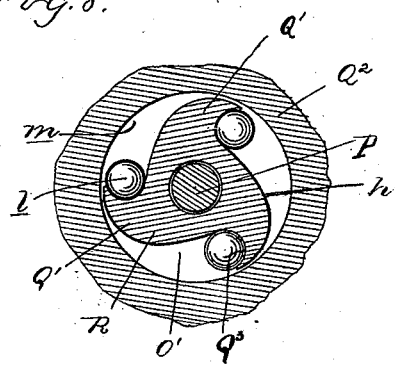
Figure 7:
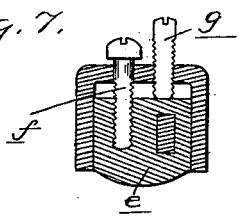
Figure 4:
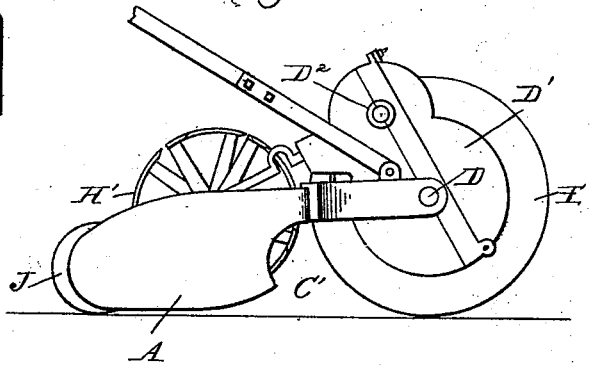

In the drawings, Figure 1 is a top plan view of a lawn mower embodying my invention. Fig. 2 is a vertical central, longitudinal section. Fig. 3 is a side elevation of the gear box. Fig. 4 is a side elevation of the mower. Fig. 5 is an enlarged section through the shaft of the ground wheel. Fig. 6 is a horizontal section on line $x\ x$ of Fig. 2 to illustrate the cutter drive shaft. Fig. 7 is a detail section of the roller supporting block. Fig. 8 is an enlarged section on line $y\ y$ Fig. 5.

The frame of the machine comprises the side bars A, bent in rear of the cutter to have the inwardly extending arms B, which are connected together by the bracket C. This bracket is provided with suitable boxes C', which are supported upon the shaft D of the ground wheels E, which are feathered to the shaft at each end, and are adjustable longitudinally thereon by means of the set screws $a$, in the hubs of the wheels and engaging in slots $b$ in the ends of the shaft.

G is the cutter shaft journaled at its ends in vertically adjustable boxes H, secured to the side bars of the frame. This cutter shaft is provided with two sets of cutter blades H' preferably spirally arranged and secured to heads, which in turn are secured to the shafts in the usual manner. These blades on the two cutters at their inner ends are staggered, that is the blades of the opposite cutters alternate around the shaft and their inner ends overlap so as to produce a continuous cutting across the entire length of the cutter.

I is a stationary blade secured to the side bars at its ends and arranged in proper relation to the revolving cutter.

At the rear end of the machine is adjustably supported the ground roller J. This adjustment is effected by securing the end of the roller shaft in a block $e$, which is raised and lowered by means of a screw bolt $f$ and is held in its adjusted position by means of the set screw $g$, all as shown in Fig. 7. This wheel regulates the height at which the cutters stand in relation to the ground. Between the heads of the two cutters and journaled on the cutter shaft is a block K, to which is secured a hollow casing K'. L is a bevel gear wheel secured to the cutter shaft within this casing and L' is a bevel pinion meshing therewith and secured near the inner end of the drive shaft M, the inner end of this shaft engages in the bearing M' in the block K, as plainly shown in Figs. 2 and 6.

N is a crank in the shaft M, arranged in the path of the cutter blades H', and the parts are so combined and proportioned that as the crank shaft revolves its opening will be turned in proper relation to the overlapping ends of the cutter blades, so that as each overlapping end of the opposite heads alternately reaches that point in its revolution, the crank will present a space through which the overlapping end of the blade can pass, as plainly shown in Fig. 6. The forward end of this drive shaft is journaled in the bracket $C^2$ on the gear casing D' and is provided with a beveled pinion O, with which the beveled gear wheel O' meshes.

The gear wheel O' is fast upon the shaft P, which is journaled in the gear casing D' as shown in Fig. 5.

$P^2$ is a pinion sleeved on the shaft P, meshing with the gear wheel $D^2$ on the ground wheel shaft.

On the hub of the pinion is formed the star wheel Q' running inside the ring $Q^2$ on the bevel gear wheel O', and $Q^3$ are balls in the interdental spaces of said wheel, acting as a ratchet and pawl device to impart motion from the ground wheels to the cutter shaft through the connections described only in the forward movement of the machine. With this device in which the blades extend to the sides of the machine and yet all the way across and with the drive gears applied in the middle, I am enabled to trim closely beside houses, fences, trees, &c., without leaving a strip in the middle.

In the ordinary use of the machine I prefer to run out the ground wheels to the position shown in full lines in Fig. 1, but in trimming as described, I retract them to the position shown in dotted lines in Fig. 1 within the sides of the frame.

What I claim as my invention is—

1. In a lawn mower, the combination of a cutter shaft, two cutters thereon having their meeting ends overlapped and staggered, and a cranked drive shaft for the cutter shaft arranged to present the opening in the crank to permit the passage of the cutter blades, substantially as described.

2. In a lawn mower, the combination of a cutter shaft, cutter blades thereon having their ends overlapped, a drive pinion upon the shaft, a drive shaft having a gear wheel engaging therewith, and a crank in the drive shaft in the path of the blades, substantially as described.

3. A drive mechanism for lawn mowers comprising a ground wheel and its shaft, a gear wheel thereon, a drive shaft having a gear wheel meshing therewith, a cutter shaft, cutters secured thereto, a bearing block journaled on the shaft, a gear wheel secured to the shaft beside the bearing block between the cutters, a bearing for the drive shaft in the bearing block, a drive pinion on the drive shaft meshing with the gear wheel and a crank in the drive shaft in line with the cutters, substantially as described.

In testimony whereof I affix my signature in presence of two witnesses.

SIMON PETER GRAHAM.

Witnesses:
M. B. O'DOGHERTY,
JAMES WHITTEMORE.